Dec. 24, 1957 V. L. WANTZ 2,817,487
SPECTACLE HOLDER
Filed Nov. 5, 1953
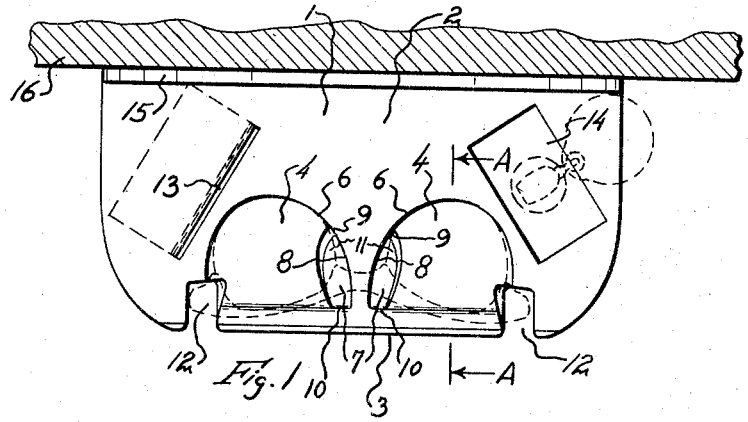
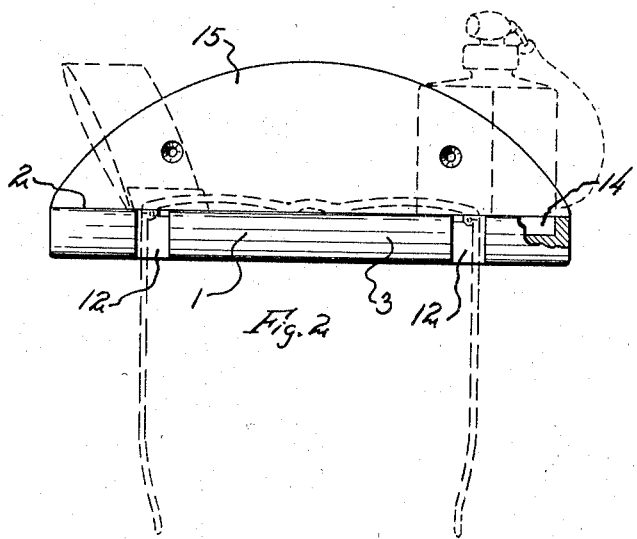
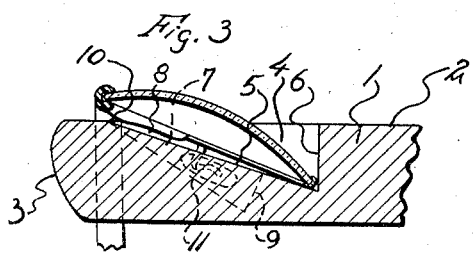
INVENTOR
VERNON L. WANTZ
BY Williamson, Williamson,
Schroeder & Adams
ATTORNEYS

United States Patent Office 2,817,487
Patented Dec. 24, 1957

2,817,487

SPECTACLE HOLDER

Vernon L. Wantz, Minneapolis, Minn.

Application November 5, 1953, Serial No. 390,362

4 Claims. (Cl. 248—309)

This invention relates to a device designed to conveniently store a pair of eyeglasses when not in use so as to have the eyeglasses in a definite, easily accessible, reasonably safe place.

For those persons who must wear eyeglasses, temporary storage of their eyeglasses is always a problem while attending to their toilet in bathroom or dressing room. Without having a regular, definite place for storage of glasses, they are often times hard to find, and are apt to be caught by movement of some other object such as clothing and towels, thus causing frequent breakage of the eyeglasses. It is to the remedy of this source of inconvenience, expense and worry that this invention is directed. Prior attempts have been made to solve this problem, but each of the prior attempts has serious drawbacks, restrictions or limitations.

One object of the instant invention is to probide a definite place for the exclusive storage of a pair of eyeglasses at a location where temporary storage is frequently needed.

Another object of the instant invention is to provide a device of novel construction upon which the user may easily and conveniently place his glasses.

Still another object of this invention is to arrange the parts of the device and glasses to be stored in such a position that moving objects such as towels or clothes or moving persons are unlikely to hit or accidentally catch the appendages of the eyeglasses and accidentally pull them onto the floor.

A further object of this invention is to protect the eyeglasses while in storage from accidental impact from below and also to prevent the glasses from being scratched by the rack or by external movement of persons or things.

Another object of this invention is to conveniently locate for storage and use, eyeglass accessories which are often times used at the time of temporary storage of glasses.

These and other objects and advantages of my invention will more fully appear from the following description made in connection with the accompanying drawings, wherein like reference characters refer to similar parts throughout the several views, and in which:

Fig. 1 is a plan view of the spectacle holder;

Fig. 2 is a front elevational view of the spectacle holder showing the position of the glasses while in storage on the holder, and also showing the eyeglass accessories in position on the holder; and Fig. 3 is a partial sectional view taken at A—A of Fig. 1.

One embodiment of my invention is shown in the views enumerated above. As shown, it may include a platform 1 mounted on a wall 16 with an upper plane surface 2 and a front edge surface 3. The platform has two semi-orbiculate recesses 4 which receive a major portion of the lenses and frame of a pair of eyeglasses. These recesses 4 have a lower lens-receiving surface 5 which engages a major portion of the frame of the eyeglasses and possibly the lens of the eyeglasses, depending on the shape of the lens thereof. The lower surface 5 lies in a plane which is at an acute angle to the plane of the upper surface 2. The plane of surface 5 and the plane of surface 2 intersect near the front edge surface 3. On the periphery of the recess 4 is surface 6 lying substantially perpendicular to the plane of the platform's upper surface 2, said surface 6 extending along the entire periphery of the recess 4, terminating at the intersection of the plane of lower surface 5 and the plane of the platform's upper surface 2. When the eyeglasses are placed on the platform 1 and in the recess 4, the lower portion of the frames or peripheral edge of the eyeglass engages surface 6 and is supported thereby.

In the platform 1 and lower surface 5 of the semi-orbiculate recesses 4 are another pair of recesses 7 which are oblong-ovate in shape. These recesses 7 have lateral edges 8, acute end portions 9 and obtuse end portions 10. One of the lateral edges 8 of each of the recesses 7 is contiguous with the peripheral edge surface 6 of recess 4. The recesses 7 are positioned in the adjacent portions of recesses 4. Each of the recesses 7 has a lower surface 11 which lies in a plane and intersects the plane of the platform's upper surface 2 near the front edge surface 3, the obtuse ends 10 of recesses 7 being near said intersection. These recesses 7 are designed to receive the nose guards of a pair of eyeglasses when the same are placed upon the platform 1 and in recesses 4.

In the platform 1 at the front edge surface 3 and extending inwardly therefrom, are a pair of laterally spaced recesses 12 extending through platform 1 positioned at the outer termination of the peripheral edge surfaces 5 of recesses 4. These recesses 12 are rectangular or oblong in shape and are designed and positioned to receive the bows of a pair of eyeglasses when the same are placed upon the platform 1 and in recesses 4. When the eyeglasses are placed upon the platform 1, the frames and lens lie convexly upward on surface 5 and against surface 6, the bows hanging downwardly through recesses 12 and bend inwardly toward the wall 16.

Adjacent to one of the recesses 4 and in the platform 1 and upper surface 2 is a long, narrow slot 13. This slot is so positioned to provide a handy and convenient place and means to store a packet of lens-cleaning tissues. The depth of the slot 13 is not critical, but must be such that it will receive and support a packet of lens-cleaning tissues.

Adjacent to one of the recesses 4 and in the platform 1 and the platform's upper surface 2 is a rectangular recess designated to receive and hold firmly an atomizer bottle of lens-cleaning compound in such a position as to allow the user to spray his lenses while the bottle is held firmly in the recess. The plunger and spray nozzle is pointed to spray away from the wall.

The platform 1 may be affixed to a vertical wall by any convenient means which will hold the platform 1 in a substantially horizontal position. Wall bracket 15 is here shown as one method of fastening platform 1 to a wall.

In use, the platform and recesses will receive the frame, lenses and nose guards of a pair of glasses in such a manner that no appendages will be extending vertically from the eyeglasses, and the bows will be extending below the platform, the curved portion of the bows extending inwardly toward the wall. With no outwardly extending appendages or elements, it is unlikely that the eyeglasses will be accidentally hit or caught by some person, article of clothing, or towel and thereby preventing the glasses from being broken on the floor. Not only are all of the eyeglasses' appendages hidden, but substantially all of the eyeglasses are beneath the upper surface of the platform, thus protecting the lenses of the eyeglasses from being injured by impact. When the eyeglasses are placed upon the platform, the inner or lower surfaces of the lens of the eyeglasses are protected from impact from below by the platform.

The use of a device such as this in storing a pair of eyeglasses while the wearer attends to his toilet makes a definite and exclusive storage place for the glasses while not in use. This feature of regularity of storage is highly convenient for the user as he will always be sure where his glasses are and will be able to find them by sense of touch even though his eye-sight is impaired. In addition to this convenience, the instant invention provides regular and convenient storage for eyeglass accessories, lens cleaning compound and tissues, thereby making a definite storage place for these articles which are normally frequently misplaced.

It will, of course, be understood that various changes may be made in the form, details, arrangement and proportions of the various parts without departing from the scope of my invention.

What I claim is:

1. A spectacle holder comprising a platform adapted to be mounted upon the wall of a bathroom to extend outwardly and substantially horizontally from said wall, and having an upper surface; said upper surface having a pair of adjacent, laterally spaced, partially orbiculate recesses for substantially completely receiving the lens and frame of a pair of eyeglasses, said recesses having lens-supporting surfaces to support the lens and frame of a pair of eyeglasses; and a second pair of adjacent laterally spaced oblong-ovate recesses for receiving the nose guards of a pair of eyeglasses, formed one each in the adjacent portions of each of said lens-supporting surfaces.

2. A spectacle holder comprising a platform adapted to be mounted upon the wall of a bathroom to extend outwardly and substantially horizontally from said wall, and having an upper surface lying in a plane and having a front edge surface; said platform having a pair of adjacent, laterally spaced, semi-orbiculate recesses formed in its upper surface, said recesses having a peripheral edge and having a lens-supporting surface lying in a plane which is at an acute angle with the plane of the upper surface of said platform; a pair of laterally spaced oblong-ovate recesses having lateral edges and acute and obtuse end portions for receiving the nose guards of a pair of glasses, said oblong-ovate recesses being formed one each in the adjacent portions of the said lens-supporting surfaces, a lateral edge of each of said oblong-ovate recesses being contiguous with the peripheral edge of one of the said semi-orbiculate recesses, the obtuse end portion of each of said oblong-ovate recesses being adjacent to the front edge surface of said platform, and said oblong-ovate recesses having lower surfaces lying in a plane which is at an acute angle with the plane of said lens-supporting surfaces; and a pair of laterally spaced oblong recesses formed in the front edge surface of said platform and extending vertically therethrough for receiving the bows of such a pair of eyeglasses.

3. In a spectacle holder for holding a pair of eyeglasses having a frame, lenses, and bow portions on a wall, the combination of a platform adapted to be mounted upon such a wall to extend outwardly and substantially horizontally therefrom and having an upper surface lying in a plane and having a front edge surface disposed outwardly from such a wall; said platform having a pair of adjacent laterally spaced, semi-orbiculate recesses that have frame-supporting peripheral edge surfaces disposed inwardly of the said front edge surface, said semi-orbiculate recesses also having lens-supporting surfaces disposed inwardly of said front edge surface and intersecting said peripheral edge surfaces; said platform having a pair of laterally spaced recesses extending vertically through the thickness of said platform at the front edge surface and inward therefrom, said vertically extending recesses, semi-orbiculate recesses and peripheral edge surfaces being so positioned relative to one another as to allow the lens and frame of a pair of eyeglasses to lie in the semi-orbiculate recesses and the bows of said eyeglasses to extend downwardly through said vertically extending recesses and from the front edge surface with the bow portions thereof inwardly toward the wall; and another pair of oblong-ovate recesses for receiving the nose guards of a pair of eyeglasses, formed one each in the adjacent portions of said lens-supporting surfaces.

4. A spectacle holder comprising a platform adapted to be mounted upon the wall of a bathroom to extend outwardly and substantially horizontally from such a wall, said platform having an upper surface and having a front edge surface; said platform having a pair of adjacent laterally spaced shallow lens-receiving recesses formed in its upper surface, and said recesses each having a peripheral edge and having a lens-supporting and protecting surface therein, said surfaces having portions proximate to each other; said platform having a pair of laterally spaced recesses formed in the proximate portions of the lens-supporting surfaces for receiving the nose guards of a pair of eye glasses, said nose guard-receiving recesses having lower surfaces; and said platform having a pair of laterally spaced openings formed in the front edge surface of said platform and extending vertically therethrough for receiving the bows of such a pair of eyeglasses.

References Cited in the file of this patent
UNITED STATES PATENTS

| | | |
|---|---|---|
| D. 173,295 | Wantz | Oct. 19, 1954 |
| 732,547 | Grooms | June 30, 1903 |
| 2,241,205 | Kimber | May 6, 1941 |